United States Patent
Chinh et al.

[11] Patent Number: 6,096,839
[45] Date of Patent: Aug. 1, 2000

[54] ATOMIZER NOZZLE

[75] Inventors: Jean-Claude Chinh, St Mitre les Remparts, France; David Newton, Surrey, United Kingdom

[73] Assignee: BP Chemicals Limited, London, United Kingdom

[21] Appl. No.: 09/082,532

[22] Filed: May 21, 1998

Related U.S. Application Data

[63] Continuation of application No. PCT/GB96/02796, Nov. 14, 1996.

[30] Foreign Application Priority Data

Nov. 23, 1995 [GB] United Kingdom ............. 9524038

[51] Int. Cl.[7] ............................... C08F 2/01; C08F 2/34
[52] U.S. Cl. ............ 526/68; 261/76; 261/78.2; 239/405; 239/406; 239/424.5; 239/429; 239/432
[58] Field of Search ............ 526/68; 261/76, 261/78.2; 239/405, 406, 424.5, 429, 432

[56] References Cited

U.S. PATENT DOCUMENTS

| | | | |
|---|---|---|---|
| 4,293,298 | 10/1981 | Bergkvist | 432/58 |
| 4,349,156 | 9/1982 | Haruch et al. | |
| 4,434,049 | 2/1984 | Dean et al. | |
| 4,460,330 | 7/1984 | Asai et al. | 431/170 |
| 5,240,183 | 8/1993 | Bedaw et al. | |
| 5,541,270 | 7/1996 | Chinh | |
| 5,553,785 | 9/1996 | Haruch | |
| 5,732,885 | 3/1998 | Huffman | |

FOREIGN PATENT DOCUMENTS

| | | |
|---|---|---|
| 586 419 | 3/1925 | France . |
| 2 443 644 | 7/1980 | France . |
| 2 118 454 | 11/1983 | United Kingdom . |
| WO 91/12084 | 8/1991 | WIPO . |
| WO 94/28032 | 12/1994 | WIPO . |

*Primary Examiner*—David Buttner
*Attorney, Agent, or Firm*—Finnegan, Henderson, Farabow, Garrett & Dunner, L.L.P.

[57] ABSTRACT

A continuous gas fluidized bed process for the polymerization of an olefin monomer, especially ethylene, propylene, or mixtures of these with other alpha-olefins, wherein monomer-containing recycle gas employed to fluidize the bed is cooled to condense out at least some liquid hydrocarbon. The condensed liquid, which can be a monomer or an inert liquid, is separated from the recycle gas and fed directly to the fluidized bed, through a gas-induced atomizer nozzle, to produce cooling by latent heat of evaporation. The nozzle is provided with a mechanical device within the liquid inlet of the atomizing chamber, that preatomizes the liquid so that the nozzle requires reduced amounts of gas compared with conventional gas-induced atomizer nozzles.

18 Claims, 3 Drawing Sheets

ATOMIZER NOZZLE

CROSS REFERENCE TO RELATED APPLICATION

This application is a Continuing Application of PCT International Application Number PCT/GB96/02796, filed Nov. 14, 1996.

BACKGROUND OF THE INVENTION

The present invention relates to a nozzle suitable for use for the injection of liquid into a fluidised bed in a continuous process for the gas-phase polymerisation of olefins, and in particular to a nozzle which allows for improved control of injection of liquid into said fluidised bed.

Processes for the homopolymerisation and copolymerisation of olefins in the gas phase are well known in the art. Such processes can be conducted for example by introducing the gaseous monomer into a stirred and/or fluidised bed comprising polyolefin and a catalyst for the polymerisation.

In the fluidised bed polymerisation of olefins, the polymerisation is conducted in a fluidised bed reactor wherein a bed of polymer particles is maintained in a fluidised state by means of an ascending gas stream comprising the gaseous reaction monomer. The start-up of such a polymerisation generally employs a bed of preformed polymer particles similar to the polymer which it is desired to manufacture. During the course of polymerisation, fresh polymer is generated by the catalytic polymerisation of the monomer, and polymer product is withdrawn to maintain the bed at more or less constant volume. An industrially favoured process employs a fluidisation grid to distribute the fluidising gas to the bed, and to act as a support for the bed when the supply of gas is cut off. The polymer produced is generally withdrawn from the reactor via a discharge conduit arranged in the lower portion of the reactor, near the fluidisation grid. The fluidised bed comprises a bed of growing polymer particles. This bed is maintained in a fluidised condition by the continuous upward flow from the base of the reactor of a fluidising gas.

The polymerisation of olefins is an exothermic reaction and it is therefore necessary to provide means to cool the bed to remove the heat of polymerisation. In the absence of such cooling the bed would increase in temperature and the polymer particles would eventually commence to fuse. In the fluidised bed polymerisation of olefins, a commonly used method for removing the heat of polymerisation is by supplying to the polymerisation reactor a gas, the fluidising gas, which is at a temperature lower than the desired polymerisation temperature, passing the gas through the fluidised bed to conduct away the heat of polymerisation, removing the gas from the reactor and cooling it by passage through an external heat exchanger, and recycling it to the bed. The temperature of the recycle gas can be adjusted in the heat exchanger to maintain the fluidised bed at the desired polymerisation temperature. In this method of polymerising alpha olefins, the recycle gas generally comprises the monomeric olefin, optionally together with, for example, diluent gas or a gaseous chain transfer agent such as hydrogen. Thus, the recycle gas serves to supply the monomer to the bed, to fluidise the bed, and to maintain the bed at the desired temperature. Monomers consumed by the polymerisation reaction are normally replaced by adding make up gas to the recycle gas stream.

It is well known that the production rate (i.e. the space time yield in terms of weight of polymer produced per unit volume of reactor space per unit time) in commercial gas fluidised bed reactors of the afore-mentioned type is restricted by the maximum rate at which heat can be removed from the reactor. The rate of heat removal can be increased, for example, by increasing the velocity of the recycle gas and/or reducing the temperature of the recycle gas and/or changing the heat capacity of the recycle gas. However, there is a limit to the velocity of the recycle gas which can be used in commercial practice. Beyond this limit the bed can become unstable or even lift out of the reactor in the gas stream, leading to blockage of the recycle line and damage to the recycle gas compressor or blower. There is also a limit on the extent to which the recycle gas can be cooled in practice. This is primarily determined by economic considerations, and in practise is normally determined by the temperature of the industrial cooling water available on site. Refrigeration can be employed if desired, but this adds to the production costs. Thus, in commercial practice, the use of cooled recycle gas as the sole means of removing the heat of polymerisation from the gas fluidised bed polymerisation of olefins has the disadvantage of limiting the maximum production rates obtainable.

The prior art suggests a number of methods for increasing the heat removal capacity of the recycle stream, for example, by introducing a volatile liquid.

GB 1415442 relates to the gas phase polymerisation of vinyl chloride in a stirred or fluidised bed reactor, the polymerisation being carried out in the presence of at least one gaseous diluent having a boiling point below that of vinyl chloride. Example 1 of this reference describes the control of the temperature of polymerisation by the intermittent addition of liquid vinyl chloride to fluidised polyvinyl chloride material. The liquid vinyl chloride evaporated immediately in the bed resulting in the removal of the heat of polymerisation.

U.S. Pat. No. 3,625,932 describes a process for polymerisation of vinyl chloride wherein beds of polyvinyl chloride particles within a multiple stage fluidised bed reactor are kept fluidised by the introduction of gaseous vinyl chloride monomer at the bottom of the reactor. Cooling of each of the beds to remove heat of polymerisation generated therein is provided by spraying liquid vinyl chloride monomer into the ascending gas stream beneath the trays on which the beds are fluidised.

FR 2215802 relates to a spray nozzle of the non-return valve type, suitable for spraying liquids into fluidised beds, for example in the gas fluidised bed polymerisation of ethylenically unsaturated monomers. The liquid, which is used for cooling the bed, can be the monomer to be polymerised, or if ethylene is to be polymerised, it can be a liquid saturated hydrocarbon. The spray nozzle is described by reference to the fluidised bed polymerisation of vinyl chloride.

GB 1398965 discloses the fluidised bed polymerisation of ethylenically unsaturated monomers, especially vinyl chloride, wherein thermal control of the polymerisation is effected by injecting liquid monomer into the bed using one or more spray nozzles situated at a height between 0 and 75% of that of the fluidised material in the reactor.

U.S. Pat. No. 4,390,669 relates to homo- or copolymerisation of olefins by a multi-step gas phase process which can be carried out in stirred bed reactors, fluidised bed reactors, stirred fluidised bed reactors or tubular reactors. In this process polymer obtained from a first polymerisation zone is suspended in an intermediate zone in an easily volatile liquid hydrocarbon, and the suspension so obtained is fed to a second polymerisation zone where the liquid hydrocarbon"

evaporates. In Examples 1 to 5, gas from the second polymerisation zone is conveyed through a cooler (heat exchanger) wherein some of the liquid hydrocarbon condenses (with comonomer if this is employed). The volatile liquid condensate is partly sent in the liquid state to the polymerisation vessel where it is vaporised for utilisation in removing the heat of polymerisation by its latent heat of evaporation.

EP 89691 relates to a process for increasing the space time yield in continuous gas fluidised bed processes for the polymerisation of fluid monomers, the process comprising cooling part or all of the unreacted fluids to form a two phase mixture of gas and entrained liquid below the dew point and reintroducing said two phase mixture into the reactor. The specification of EP 89691 states that a primary limitation on the extent to which the recycle gas stream can be cooled below the dew point is in the requirement that the gas-to-liquid ratio be maintained at a level sufficient to keep the liquid phase of the two phase fluid mixture in an entrained or suspended condition until the liquid is vaporised, and further states that the quantity of liquid in the gas phase should not exceed about 20 weight percent, and preferably should not exceed about 10 weight percent, provided always that the velocity of the two phase recycle stream is high enough to keep the liquid phase in suspension in the gas and to support the fluidised bed within the reactor. EP 89691 further discloses that it is possible to form a two-phase fluid stream within the reactor at the point of injection by separately injecting gas and liquid under conditions which will produce a two phase stream, but that there is little advantage seen in operating in this fashion due to the added and unnecessary burden and cost of separating the gas and liquid phases after cooling.

EP 173261 relates to a particular means for introducing a recycle stream into fluidised bed reactors and, in particular, to a means for introducing a recycle stream comprising a two phase mixture of gas and entrained liquid as described in EP 89691 (supra).

WO 94/25495 describes a fluidised bed polymerisation process comprising passing a gaseous stream comprising monomer through a fluidised bed reactor in the presence of a catalyst under reactive conditions to produce polymeric product and a stream comprising unreacted monomer gases, compressing and cooling said stream, mixing said stream with feed components and returning a gas and liquid phase to said reactor, a method of determining stable operating conditions which comprises: (a) observing fluidised bulk density changes in the reactor associated with changes in the composition of the fluidising medium; and (b) increasing the cooling capacity of the recycle stream by changing the composition without exceeding the level at which a reduction in the fluidised bulk density or a parameter indicative thereof becomes irreversible.

U.S. Pat. No. 5,436,304 relates to a process for polymerising alpha-olefin(s) in a gas phase reactor having a fluidised bed and a fluidising medium wherein the fluidising medium serves to control the cooling capacity of the reactor and wherein the bulk density function (Z) is maintained at a value equal to or greater than the calculated limit of the bulk density function.

Published application WO 94128032 which by reference is incorporated herein, relates to a continuous gas phase fluidised bed process in which the productivity of the process is improved by cooling the recycle gas stream to a temperature sufficient to form a liquid and a gas, separating the liquid from the gas and feeding the separated liquid directly to the fluidised bed. The liquid may be suitably injected into the fluidised bed by means of one or more nozzles arranged therein.

The liquid may be injected into the fluidised bed by means of nozzles which use an atomising gas to assist in the injection of the liquid. During scale-up of gas-liquid nozzles unexpected problems arose when the rate of liquid injection into the bed increased beyond a certain limit. This limit is dependent upon the gas expansion ratio (the ratio of the pressure of the atomising gas fed to the nozzle and the pressure of the fluidised bed) as well as the percentage by weight of atomising gas and the dimensions of both the atomising chamber and the outlets of the nozzle. It was necessary to increase the amount of atomising gas relative to the amount of liquid injected into the bed in order that efficient atomisation of the liquid could be maintained and also to maintain effective dispersion and penetration of liquid into the fluidised bed i.e. large scale nozzles required significantly increased amounts of atomising gas. It has now been found that by using a mechanical device within such a nozzle to 'preatomise' the liquid the amount of gas required to atomise the liquid may be considerably reduced.

SUMMARY OF THE INVENTION

Thus, according to the present invention there is provided a process for the introduction of liquid directly into a fluidised bed which comprises:
(a) pressurising the liquid;
(b) feeding the pressurised liquid to a liquid inlet of an atomising chamber of a nozzle;
(c) preatomising the liquid using a mechanical device positioned within the liquid inlet;
(d) feeding assisting atomising gas to a gas inlet of the atomising chamber;
(e) atomising the preatomised liquid in the atomising chamber using the assisting atomising gas; and
(f) discharging the atomised liquid as a spray into the fluidised bed through at least one outlet of the atomising chamber.

In a further embodiment of the present invention there is provided a continuous gas fluidised bed process for the polymerisation of olefin monomer selected from (a) ethylene, (b) propylene, (c) mixtures of ethylene and propylene and (d) one or more other alpha-olefins mixed with (a), (b) or (c), in a fluidised bed reactor by continuously recycling a gaseous stream comprising at least some of the ethylene and/or propylene through a fluidised bed in said reactor in the presence of a polymerisation catalyst under reactive conditions, at least part of the said gaseous stream withdrawn from said reactor being cooled to a temperature at which liquid condenses out, separating at least part of the condensed liquid from the gaseous stream and introducing at least part of the separated liquid directly into the fluidised bed by:
(a) pressurising the liquid;
(b) feeding the pressurised liquid to a liquid inlet of an atomising chamber of a nozzle;
(c) preatomising the liquid using a mechanical device positioned within the liquid inlet;
(d) feeding assisting atomising gas to a gas inlet of the atomising chamber;
(e) atomising the preatomised liquid in the atomising chamber using the assisting atomising gas; and
(f) discharging the atomised liquid as a spray into the fluidised bed through at least one outlet of the atomising chamber.

According to yet a further embodiment of the present invention there is provided a nozzle suitable for use for the injection of liquid into a fluidized bed said nozzle comprising:

(a) an atomizing chamber;

(b) a liquid inlet to the atomizing chamber;

(c) a gas inlet to the atomizing chamber; and (d) at least one atomized liquid outlet from the chamber; characterized in that within the liquid inlet there is provided a mechanical device to preatomize the liquid.

BRIEF DESCRIPTION OF THE DRAWINGS

The invention will now be described with reference to the drawings, in which.

DETAILED DESCRIPTION OF THE INVENTION

Figure 1:
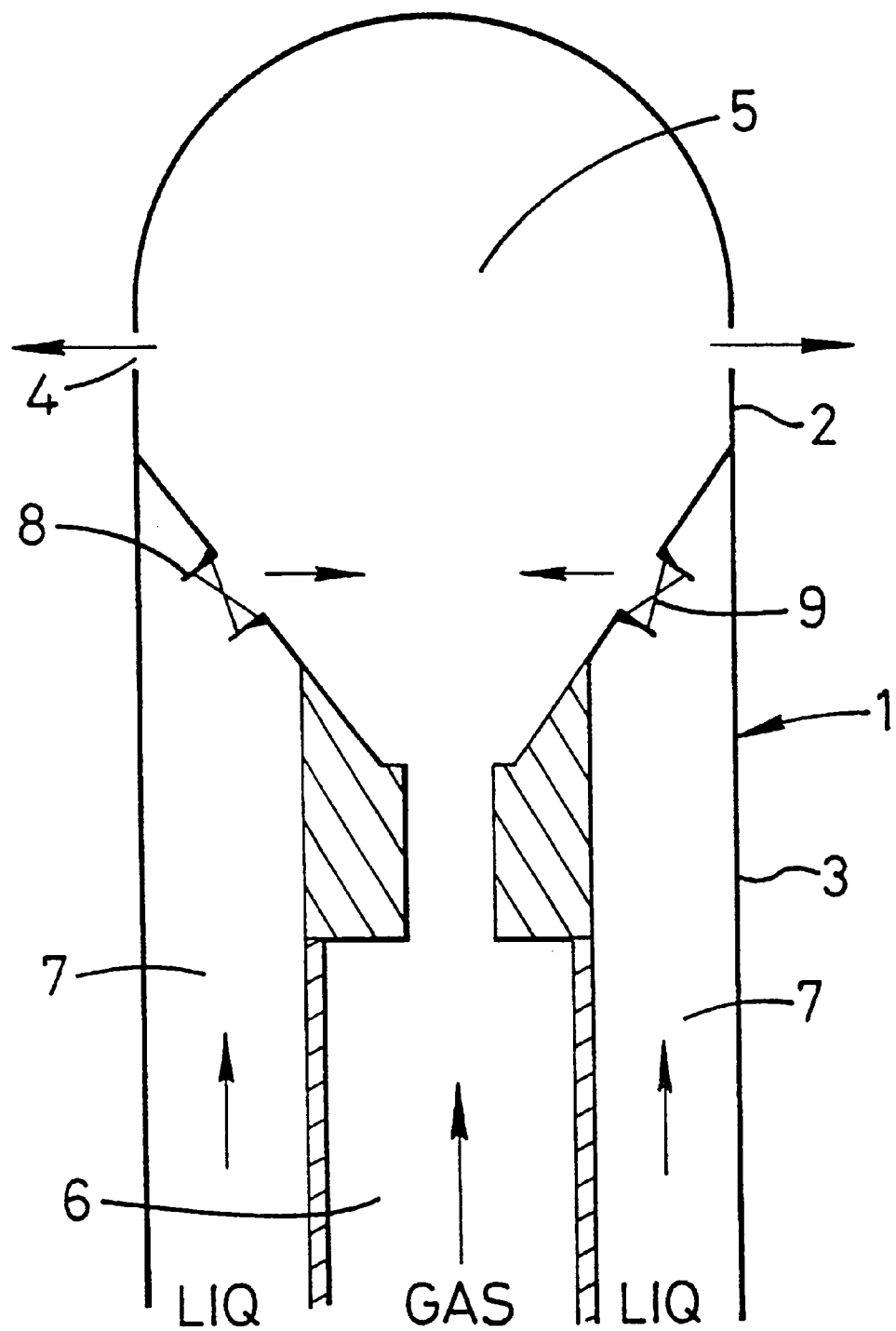
FIG. 1 illustrates a nozzle according to the present invention.

In this specification the term 'preatomise' means that the liquid is broken into droplets. Generally, the preatomised liquid alone does not have droplets of sufficient momentum to achieve the desired spray profile, penetration and dispersion of liquid within the fluidised bed.

The mechanical device may suitably be any mechanical device which imparts a flow pattern to the liquid thereby allowing preatomisation of the liquid to occur and improving both the spray profile of the liquid as well as controlling the droplet size. Such mechanical devices are well known for atomising liquids such as water (for fire suppression) and paints (for coating purposes). Suitable mechanical devices include swirl devices, baffle plates, impingement devices, fan devices,. ultrasonic devices or some other form of mechanical device to preatomise the liquid.

Suitable swirl devices include swirl vanes having a helical configuration, for example, swirl baffles.

The assisting atomising gas is required to further aid atomisation, to obtain the necessary penetration of the atomised liquid spray discharged from the atomising chamber into the fluidised bed, and to reatomise any liquid droplets which may coalesce in the atomising chamber, for example, through collisions with the internal walls of the atomising chamber. The assisting atomising gas also acts as a purge gas, if needed, and prevents ingress of particles into the nozzle from the fluidised bed.

The amount of gas required to atomise the liquid in the atomisation chamber is considerably reduced compared with the amount required if there was no 'preatomisation' of the liquid before the liquid enters the atomising chamber.

In the process of the present invention the spray of atomised liquid is formed after the liquid has been preatomised by the mechanical device. Atomisation takes place in the atomnisation chamber approximately 10 to 30 mm from the mechanical device. It was found that the mechanical device cannot simply be placed directly in the fluidised bed because the particles of the fluidised bed inhibit the formation of liquid droplets, preventing atomisation. Thus, the spray of atomised liquid must be allowed to be formed before the liquid enters the fluidised bed.

Preferably, the atomising chamber has more than one outlet, preferably 1 to 4 outlets.

The volume of the atomising chamber may be in the range 8.5 to 384 $cm^3$.

The outlet(s) may comprise circular holes, rectangular or elliptical slots, or other suitable configurations. Preferably, where the outlet(s) are slots they are elliptical in shape.

Each of the outlet(s) may have a cross-sectional area in the range from 78.5 to 525.0 $mm^2$.

It is important that the outlet(s) of the nozzle are of sufficient size to allow for the passage of any fines which may be present in the separated liquid stream.

In a modification of the process of the present invention each outlet for the atomised liquid may have a separate atomising chamber and mechanical device orientated in-line with the outlet. This configuration has an advantage that there is a significant reduction in the surface area of the atomising chamber which leads to a reduction in liquid coalescence thereby further reducing the amount of assisting atomising gas required. Furthermore, greater control of the liquid spray penetration and dispersion may be obtained using such an arrangement. This has the advantage of increasing the quantity of liquid that may be introduced continuously to the fluidised bed without localised wetting of the particles of the bed in the region of the nozzles and subsequent defluidisation of the bed (wet quenching).

Preferably the atomised liquid spray is introduced directly into the fluidised bed above the upper limit of the temperature gradient between the entering fluidising gas (the gaseous stream fed to the reactor) and the remainder of the bed. Commercial processes for the gas fluidised bed polymerisation of olefins are generally operated under substantially isothermal, steady state conditions. However, although almost all of the fluidised bed is maintained at the desired substantially isothermal polymerisation temperature, there normally exists a temperature gradient in the region of the bed immediately above the point of introduction of the cooled gas stream into the bed. The lower temperature limit of this region wherein the temperature gradient exists is the temperature of the incoming cool gas stream, and the upper limit is the substantially isothermal bed temperature. In commercial reactors of the type which employ a fluidisation grid, typically 5–20 m high, this temperature gradient normally exists in a layer of about 15 to 30 cm (6 to 12 inches) above the grid.

A single nozzle may be used or a plurality of nozzles may be arranged within the fluidised bed.

The number of outlets per nozzle is preferably in the range 1 to 16, preferably 4–8.

A preferred arrangement is to provide a plurality of nozzles substantially equally spaced in the fluidised bed on a given pitch circle diameter in the region of the introduction of the liquid. The number of nozzles used is that number which is required to provide sufficient penetration and dispersion of the atomised liquid spray at each nozzle to achieve good dispersion of liquid across the bed. A preferred number of nozzles is 1 to 8, more preferably 1 to 4, most preferably 4.

Each of the nozzles may, if desired, be supplied with separated liquid by means of a common conduit suitably arranged within the reactor. This can be provided, for example, by means of a conduit passing up through the centre of the reactor.

The nozzles are preferably arranged such that they protrude substantially vertically into the fluidised bed, but may be arranged such that they protrude from the walls of the reactor in a substantially horizontal direction.

The rate at which liquid can be introduced into the bed depends primarily on the degree of cooling desired in the bed, and this in turn depends on the desired rate of production from the bed. The rates of production obtainable from commercial fluidised bed polymerisation processes for the polymerisation of olefins depend, inter alia on the activity of the catalysts employed, and on the kinetics of such catalysts. Thus, for example, when catalysts having very high activity are employed, and high production rates are desired, the rate of liquid addition will be high. Typical rates of liquid introduction may be, for example, in the range 0.1 to 4.9, preferably 0.3 to 4.9 cubic meters of liquid per cubic meter of bed material per hour. For conventional Ziegler catalysts of the "superactive" type (i.e. those based on transition metal, magnesium halide and organometallic cocatalyst, the rate of liquid addition may be, for example, in the range 0.5 to 1.5 cubic meters of liquid per cubic meter of bed material per hour.

The throughput of liquid through the nozzle may be in the range 10 to 100, preferably 10 to 80 m$^3$/h (6.2 to 67.0, preferably 6.2 to 53.6 te/hr).

In the process of the present invention the weight ratio of liquid:total gas which may be introduced into the bed can be, for example, in the range 1: 100 to 1:1, preferably in the range 5:100 to 85:100, most preferably in the range 6:100 to 25:100. By total gas is meant the gas which is returned to the reactor to fluidise the bed together with the assisting atomising gas. The assisting atomising gas may suitably be an inert gas, for example, nitrogen but is preferably make-up ethylene or recycle gas.

The weight ratio of atomising gas to liquid which may be introduced into the bed may be in the range 0.5:1 to 5:1, but is preferably approximately 2:1.

The pressure of the assisting atomising gas fed to the gas inlet of the atomising chamber may be in the range from 2 to 6 bar above the pressure of the fluidised bed.

The pressure of the fluidised bed may be in the range 0.5 to 6 MPa, preferably 1.72 to 2.74 MPa (17 to 27 barg).

The gas expansion ratio (the ratio of the pressure of the assisting atomising gas fed to the nozzle and the pressure of the fluidised bed) is preferably in the range 1.074 to 1.353.

The pressure drop of the assisting atomising gas over the atomising chamber and the outlets of the nozzle may be in the range 1.0 to 6 bar.

The pressure drop of liquid over the mechanical device of the nozzle may be from 0.5 to 30 bar.

By injecting the liquid into the fluidised bed using the process of the present invention any catalyst which is introduced in the liquid may benefit from the localised cooling effect of the liquid surrounding the nozzle(s) which may avoid hot spots and consequent agglomeration.

It is important in the process of the present invention to achieve good dispersion and penetration of the liquid in the fluidised bed. Factors which are important in achieving good penetration and dispersion are the momentum and direction of the spray of atomised liquid entering the bed (the spray profile), the number of nozzle(s) per unit cross-sectional area of the bed, and the spatial arrangement of the nozzle(s).

The atomised liquid spray which is discharged from the outlet(s) of the atomising chamber has a horizontal momentum flux of at least $50\times10^3$ Kg s$^{-1}$ m$^{-2}$×m s$^{-1}$ wherein the horizontal momentum flux is defined as the mass flow rate of liquid (kilogrammes per second) in the horizontal direction per unit cross-sectional area (square meters) of the outlet from which the atomised liquid spray emerges, multiplied by the horizontal component of the velocity (meters per second) of the atomised liquid spray.

Preferably the horizontal momentum flux of the atomised liquid spray discharged from the outlet(s) of the atomising chamber is at least $100\times10^3$ and most preferably at least $200\times10^3$ Kg s$^{-1}$ m$^{-2}$×m s$^{-1}$. Particularly preferred is the use of a horizontal momentum flux in the range $300\times10^3$ to $500\times10^3$ Kg s$^{-1}$ m$^{-2}$×m s$^{-1}$. In the case that the atomised liquid spray emerges from the outlet(s) in a direction other than horizontal, the horizontal component of the velocity of the atomised liquid spray is calculated from Cosine Q° x actual atomised liquid velocity, wherein Q° is the angle the atomised liquid spray makes with the horizontal.

The direction of motion of the atomised liquid spray into the bed is preferably substantially horizontal. In the case that the outlet(s) deliver the atomised liquid spray in a direction other than horizontal, preferably the direction of the atomised liquid spray is at an angle not greater than 45°, most preferably not more than 20° to the horizontal.

The gaseous recycle stream withdrawn from the reactor comprises unreacted gaseous monomers, and optionally, inert hydrocarbons, inert gases such as nitrogen, reaction activators or moderators such as hydrogen, as well as entrained catalyst and/or polymer particles.

The recycled gaseous stream fed to the reactor additionally comprises sufficient make-up monomers to replace those monomers polymerised in the reactor.

The process according to the present invention is suitable for the manufacture of polyolefins in the gas phase by the polymerisation of one or more olefins at least one of which is ethylene or propylene. Preferred alpha-olefins for use in the process of the present invention are those having from 3 to 8 carbon atoms. However, small quantities of alpha olefins having more than 8 carbon atoms, for example, 9 to 18 carbon atoms, can be employed if desired. Thus, it is possible to produce homopolymers of ethylene or propylene or copolymers of ethylene or propylene with one or more $C_3$–$C_8$ alpha-olefins. The preferred alpha-olefins are but-1-ene, pent-1-ene, hex-1-ene, 4-methylpent-1-ene, oct-1-ene and butadiene. Examples of higher olefins that can be copolymerised with the primary ethylene or propylene monomer, or as partial replacement for the $C_3$–$C_8$ alpha-olefin comonomer are dec-1-ene and ethylidene norbornene.

When the process is used for the copolymerisation of ethylene or propylene with alpha-olefins the ethylene or propylene is present as the major component of the copolymer, and preferably is present in an amount at least 70%, more preferably at least 80% by weight of the total monomers/comonomers.

The process according to the present invention may be used to prepare a wide variety of polymer products for example linear low density polyethylene (LLDPE) based on copolymers of ethylene with butene, 4-methylpent-1-ene or hexene and high density polyethylene (HDPE) which can be for example, homopolyethylene or copolymers of ethylene with a small portion of higher alpha olefin comonomer, for example, butene, pent-1-ene, hex-1-ene or 4-methylpent-1-ene.

The liquid which condenses out of the gaseous recycle stream can be a condensable monomer, e.g. butene, hexene, or octene used as a comonomer for the production of LLDPE or may be an inert condensable liquid, e.g. butane, pentane, or hexane.

In this specification, the term "condensable" means that the dew point of the gaseous composition comprising the condensable material is above the lowest temperature of the recycle loop.

It is important that the atomised liquid should vaporise within the bed under the polymerisation conditions being employed so that the desired cooling effect is obtained and to avoid substantial accumulation of liquid within the bed.

The process is particularly suitable for polymerising olefins at a pressure of between 0.5 and 6 MPa and at a temperature of between 30° C. and 130° C. For example for LLDPE production the temperature is suitably in the range 75–90° C. and for HDPE the temperature is typically 80–105° C. depending on the activity of the catalyst used.

The polymerisation reaction may be carried out in the presence of a catalyst system of the Ziegler-Natta type, consisting of a solid catalyst essentially comprising a compound of a transition metal and of a cocatalyst comprising an organic compound of a metal (i.e. an organometallic compound, for example an alkylaluminium compound). High-activity catalyst systems have already been known for a number of years and are capable of producing large quantities of polymer in a relatively short time, and thus make it possible to avoid a step of removing catalyst residues from the polymer. These high-activity catalyst systems generally comprise a solid catalyst consisting essentially of atoms of transition metal, of magnesium and of halogen. It is also possible to use a high-activity catalyst consisting essentially of a chromium oxide activated by a heat treatment and associated with a granular support based on a refractory oxide. The process is also suitable for use with metallocene catalysts and Ziegler catalysts supported on silica.

The catalyst may suitably be employed in the form of a prepolymer powder prepared beforehand during a prepolymerisation stage with the aid of a catalyst as described above. The prepolymerisation may be carried out by any suitable process, for example, polymerisation in a liquid hydrocarbon diluent or in the gas phase using a batch process, a semi-continuous process or a continuous process.

Preferably, substantially the whole of the gaseous recycle stream is cooled and the condensed liquid is separated and substantially the whole of the separated liquid is introduced directly into the fluidised bed via the nozzle(s) as an atomised liquid spray.

The gaseous recycle stream is suitably cooled by means of a heat exchanger or exchangers to a temperature such that liquid is condensed in the gaseous recycle stream. Suitable heat exchangers are well known in the art.

The gaseous recycle stream leaving the top of the reactor can entrain a quantity of catalyst and/or polymer particles (fines) and these may be removed, if desired, from the gaseous recycle stream by means of a cyclone. A small proportion of these particles may remain entrained in the gaseous recycle stream and after cooling and separating the liquid from the gas, the fines can, if desired, be reintroduced into the fluidised bed together with the separated liquid stream via the nozzle(s).

In order to avoid fouling of the nozzle(s), it is important to ensure that the mechanical device has sufficient clearance to allow for passage of any fines which may be present in the separated liquid stream. Furthermore, the outlet(s) from the atomising chamber must be of sufficient size to allow the fines to pass into the fluidised bed together with the atomised liquid spray and the assisting atomising gas.

The gaseous recycle stream may also comprise inert hydrocarbons used for the injection of catalyst, reaction activators or moderators into the reactor.

Make-up monomers, for example, ethylene to replace monomers consumed by the polymerisation reaction may be added to the gaseous recycle stream at any suitable location.

Make-up condensable comonomers, for example, butene, hexene, 4-methylpent-1-ene and octene, to replace condensable comonomers consumed by the polymerisation reaction may be introduced as liquids and added to the gaseous recycle gas stream at any suitable location.

The liquid may be separated from the gaseous recycle stream in a separator.

Suitable separators are for example cyclone separators, large vessels which reduce the velocity of the gas stream to effect separation of the condensed liquid (knock-out drums), demister type gas-liquid separators and liquid scrubbers, for example, venturi scrubbers. Such separators are well known in the art.

The use of a demister type of gas-liquid separator is particularly advantageous in the process of the present invention.

The use of a cyclone separator in the gaseous recycle stream, prior to the separator is preferred. This removes the majority of the fines from the gaseous stream leaving the reactor thereby facilitating the use of a demister separator and also reducing the possibility of fouling of the separator thereby resulting in a more efficient operation.

A further advantage of using a demister type of separator is that the pressure drop within the separator can be lower than in other types of separators thereby enhancing the efficiency of the overall process.

A particularly suitable demister separator for use in the process of the present invention is a commercially available vertical gas separator known as a "Peerless" (for example, type DPV P8X). This type of separator uses the coalescence of liquid droplets on a baffle arrangement to separate the liquid from the gas. A large liquid reservoir is provided in the bottom of the separator for collection of the liquid. The liquid reservoir enables the liquid to be stored thereby providing control over the discharge of the liquid from the separator. This type of separator is very efficient and gives 100% separation of condensed liquid from the gas stream.

If desired, a filter mesh, or other suitable means, may be arranged in the liquid reservoir of the separator to collect any remaining fines present in the separated liquid. Alternatively, any fines may be kept in suspension and thus avoid fouling of the separator by, for example, stirring the liquid in the separator (mechanical agitation), bubbling a gaseous stream through the liquid or continuously circulating the liquid by means of an external loop i.e. liquid is continuously withdrawn from and returned to the separator. Preferably, a portion of the liquid in the separator is continuously circulated by means of a pump. Suitably, sufficient liquid is circulated to allow the pump to be operated in a continuous manner. A portion of the circulating liquid may be introduced directly into the fluidised bed via a valve which opens to allow liquid to enter a supply line to the nozzle(s). Preferably, the valve is operated via a liquid level controller which monitors and maintains the level of liquid in the separator between set limits.

The separated liquid is suitably introduced into the fluidised bed via nozzle(s) arranged above the upper limit of the temperature gradient between the entering fluidising gas and the remainder of the bed. The nozzle(s) may be at a plurality of points within this region of the fluidised bed and may be at different heights within this region. The nozzle(s) are arranged such that the local concentration of liquid does not adversely affect the fluidisation of the bed or the quality of the product, and to enable the liquid to disperse rapidly from each point and vaporise in the bed to remove the heat of polymerisation from the exothermic reaction. In this way the amount of liquid introduced for cooling purposes may much more closely approach the maximum loading that can be tolerated without disturbing the fluidisation characteristics of the bed and hence offers the opportunity to achieve enhanced levels of reactor productivity.

The liquid can, if desired, be introduced into the fluidised bed via nozzle(s) positioned at different heights within the bed. Such a technique can facilitate improved control over comonomer incorporation. Controlled metering of liquid into the fluidised bed via the nozzle(s) provides useful additional control over the temperature profile of the bed and, in the case that the liquid contains comonomer, provides useful control over the comonomer incorporation into the copolymer.

In order to gain the maximum benefit of the cooling of the separated liquid it is essential that the nozzle(s) are above the region where this temperature gradient exists, i.e. in the part of the bed which has substantially reached the temperature of the gaseous recycle stream leaving the reactor.

The nozzle(s) may, for example, be approximately 20–200 cm, preferably 50–70 cm above the fluidisation grid.

In practice, the temperature profile within the fluidised bed may first be determined during polymerisation using, for example, thermocouples located in or on the walls of the reactor. The nozzle(s) is/are then arranged to ensure that the liquid enters into the region of the bed at which the returned gas stream has substantially reached the temperature of the gaseous recycle stream being withdrawn from the reactor.

It is important to ensure that the temperature within the fluidised bed is maintained at a level which is below the sintering temperature of the polyolefin constituting the bed.

The gas from the separator is recycled to the bed, normally into the bottom of the reactor. If a fluidisation grid is employed, such recycle is normally to the region below the grid, and the grid facilitates uniform distribution of the gas to fluidise the bed. The use of a fluidisation grid is preferred.

The process of the present invention is operated with a gas velocity in the fluidised bed which must be greater than or equal to that required to achieve a bubbling bed. The minimum gas velocity is generally 6–12 cm/sec but the process of the present invention is preferably carried out using a gas velocity in the range 30 to 100, most preferably 50 to 70 cm/sec.

If desired, liquid or liquid-soluble additives, for example, activators, cocatalysts and the like, can be introduced into the bed via the nozzle(s) together with the separated liquid stream.

In the case that the process of the present invention is employed to make ethylene homo- or copolymers, make-up ethylene, for example, to replace the ethylene consumed during the polymerisation, may be advantageously introduced into the separated gas stream prior to its reintroduction into the bed (for example below the fluidisation grid if such is employed).

The separated liquid stream may be subjected to additional cooling (e.g. using refrigeration techniques) before being introduced into the fluidised bed via the nozzle(s). An advantage of this particular aspect of the present invention is that, by cooling the liquid before introduction into the fluidised bed via the nozzle(s), any tendency for catalyst or prepolymer which may be contained in the liquid stream to cause polymerisation before introduction into the bed will be reduced.

Before commencing the introduction of liquid by use of the process according to the present invention the gas phase fluidised bed polymerisation is started by charging the bed with particulate polymer particles, and then initiating the gas flow through the bed.

In the nozzle according to the present invention, the atomising chamber, the outlet from the atomising chamber, and the mechanical device may have the features described above.

A benefit of the nozzle according to the present invention is that the amount of atomising gas required to operate the nozzles is significantly reduced compared with conventional gas-liquid atomising nozzles.

Nozzles according to the present invention will be further illustrated with reference to FIGS. 1 to 3.

In FIG. 1 the nozzle comprises a housing (1) comprising an upper region or cone (2) and a lower region or body (3). The cone is provided with a number of outlets (4) arranged on its circumference and an atomising chamber (5) arranged therein. The body (3) of the nozzle is provided with a centrally located conduit (6) opening into the atomising chamber (5) and an outer conduit (7) located around the inner conduit (6). The conduit (7) communicates with the atomising chamber (5) by suitably arranged openings (8). Mechanical devices (9) are arranged within each opening (8). Pressurised liquid is supplied to the nozzle by conduit (7) and assisting atomising gas is supplied to conduit (6). The lower region or body (3) of the nozzle is connected by conventional means to the supply of pressurised liquid and assisting atomising gas. The liquid is preatomised by the mechanical devices (9) and after mixing with the assisting atomising gas in the atomising chamber (5) the liquid is discharged from the nozzle into the fluidised bed as an atomised spray via the outlets (4).

Figure 2:
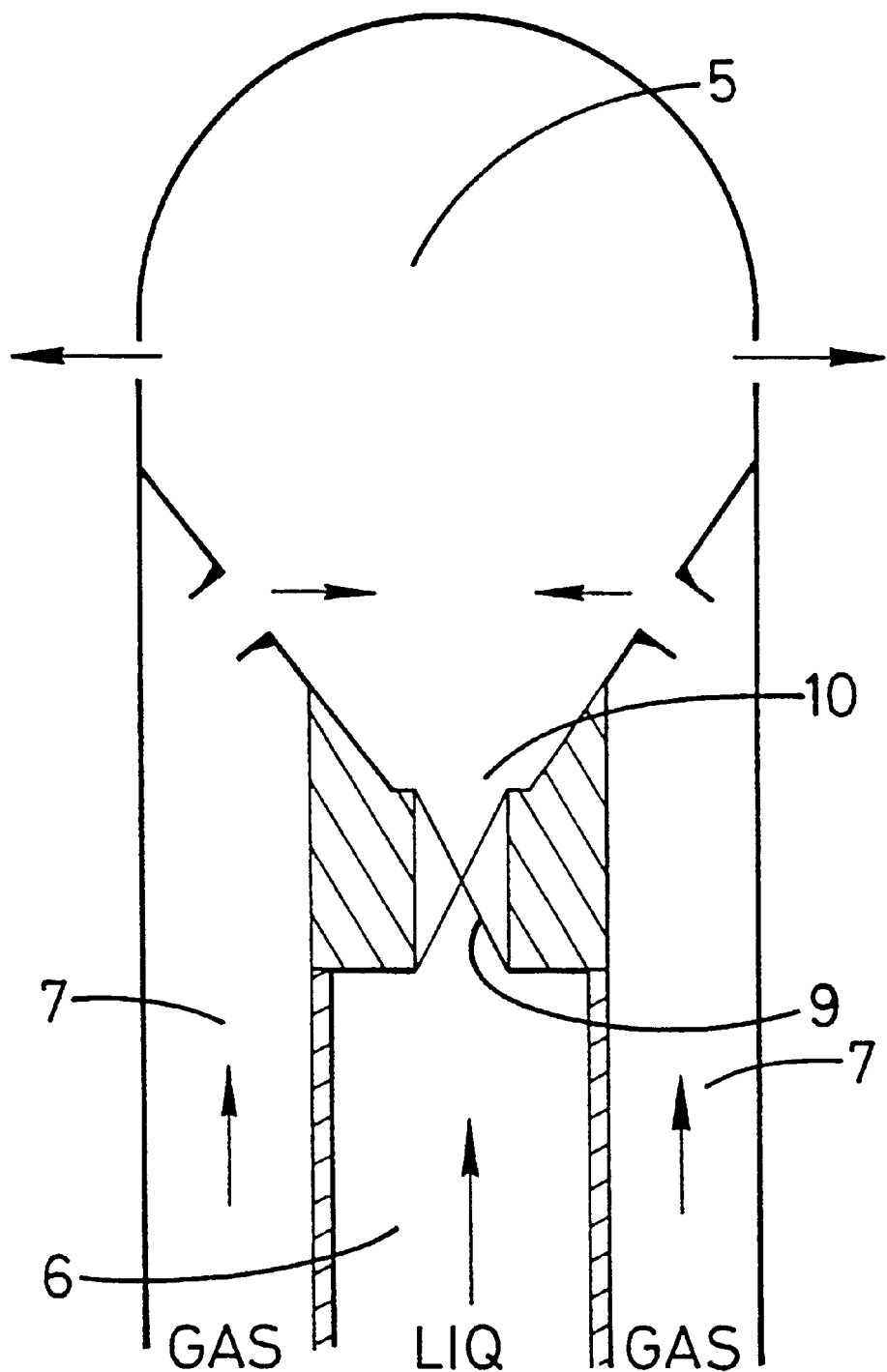
FIG. 2 illustrates an alternative arrangement of a nozzle according to the present invention.

FIG. 2 illustrates an alternative arrangement of a nozzle according to the present invention. In this arrangement the centrally located conduit (6) communicates with the mixing chamber (5) by a suitably arranged opening (10). Pressurised liquid is supplied to the nozzle by centrally located conduit (6) and assisting atomising gas is supplied is supplied to conduit (7). The liquid is preatomised by the mechanical device (9) arranged within the opening (10).

Figure 3:
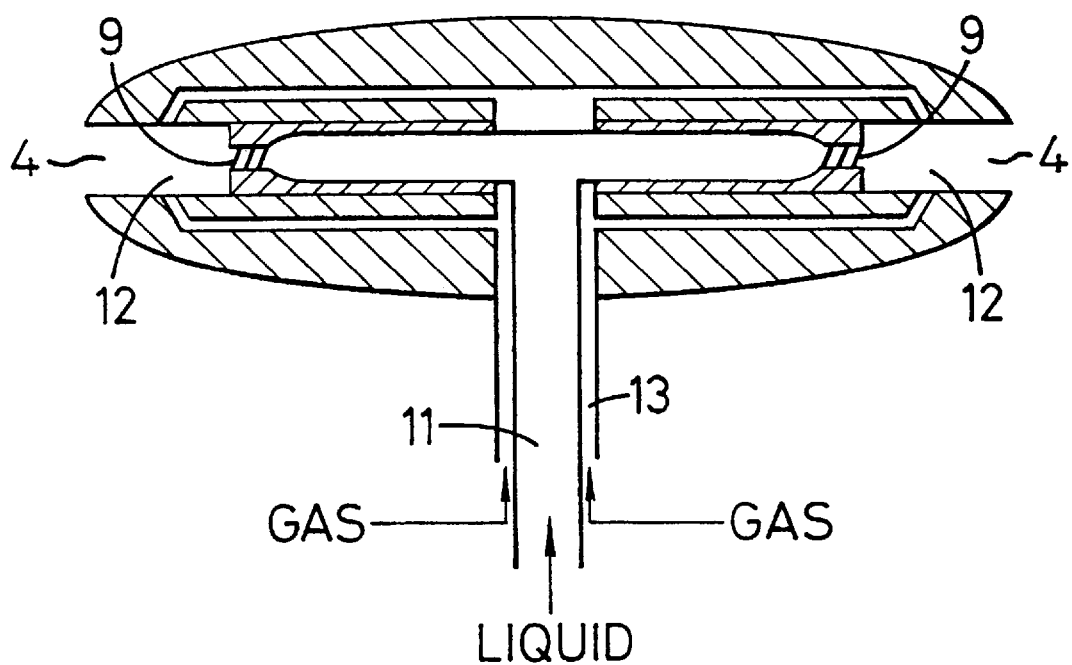
FIG. 3 illustrates yet a further arrangement of a nozzle according to the present invention.

FIG. 3 illustrates a further arrangement of a nozzle according to the present invention. In this arrangement pressurised liquid in supplied to each of the outlets (4) of the nozzle by a conduit (11). The liquid is preatomised by a mechanical device (9) located within conduit (11) in close proximity to the outlet (4). Each outlet has a separate atomising chamber (12) of sufficient size to allow a spray of atomised liquid to be formed therein. Assisting atomising gas is supplied to each atomising chamber by a conduit (13). A spray of atomised liquid is discharged from each of the outlets (4).

The process of the present invention will now be described by reference to the following example.

EXAMPLE

During scale-up of a gas-liquid nozzle (in the absence of preatomisation of the liquid with a mechanical device) a linear design procedure was employed such that the gas expansion ratio was maintained at 1.25 (pressure of gas supplied to the gas inlet to the atomising chamber was 25 barg and the pressure of the fluidised bed was 20 barg; a gas expansion ratio of 25:20=1.25:1) using 5% by weight of atomising gas. This procedure was adequate for scaling-up nozzles with a liquid injection rate of 0.48 $m^3$/h (the original scale tested) to a liquid injection rate of 18 $m^3$/h. However, larger scale nozzles having a higher liquid injection rate, when designed using the linear scale-up procedure would not adequately atomise the liquid. For example, a nozzle having a liquid injection rate of 27 m³/h would not operate successfully with 5% by weight of atomising gas. It was found that increased amounts of atomising gas were required for the nozzle to operate effectively. In addition, it was necessary to alter the ratio of the cross-sectional area of the outlets from the atomisation chamber and the volume of the atomising chamber. Thus, the scale-up was not pro rata.

The amount of gas required for a nozzle having a liquid injection rate of 30 m³/h and 80 m³/h in the presence and absence of a mechanical device is given in Table 1.

It was found that scale-up of the nozzles according to the present invention was straight forward i.e. a scaling factor does not have to be applied to alter the ratio of the cross-sectional area of the outlets from the atomising chamber and the volume of the atomising chamber with increasing nozzle throughput. Thus, the nozzles according to the present invention follow a more linear scale-up procedure with respect to the internal dimensions of the nozzle.

TABLE 1

| Liquid injection rate | Atomising gas (% by wt.) | |
|---|---|---|
| (m³/h) | no mechanical device | mechanical device |
| 30 | 7 | 2 (measured) |
| 80 | 12–15 | 2–3 (computer simulation) |

What is claimed is:

1. A continuous gas fluidized bed process for the polymerization of an olefin monomer selected from the group consisting of (a) ethylene, (b) propylene, (c) mixtures of ethylene and propylene and (d) one or more other alpha-olefins mixed with (a), (b) or (c), in a fluidized bed reactor comprising passing a gaseous stream containing said olefin monomer through a fluidized bed in a reactor in the presence of a polymerization catalyst under reactive conditions to polymerize at least a portion of said olefin monomer, withdrawing a gaseous stream containing at least some unreacted monomer from said reactor, cooling at least part of the said gaseous stream withdrawn from said reactor to a temperature at which liquid condenses out of the stream, separating at least part of the condensed liquid from the cooled gaseous stream, continuously recycling separated, cooled gas back to the reactor and introducing at least part of the separated liquid directly into the fluidized bed by:

(a) pressurizing the liquid;
(b) feeding the pressurized liquid to a liquid inlet of an atomizing chamber of a nozzle;
(c) preatomizing the liquid using a mechanical device positioned within the liquid inlet;
(d) feeding assisting atomizing gas to a gas inlet of the atomizing chamber;
(e) atomizing the preatomized liquid in the atomizing chamber using the assisting atomizing gas; and
(f) discharging the atomized liquid as a spray directly into the fluidized bed through at least one outlet of the atomizing chamber of the nozzle.

2. The process of claim 1, in which the atomizing chamber has one to four outlets.

3. The process of claim 1, in which the atomizing chamber has a volume in the range of 8.5 to 384 cm³.

4. The process of claim 1, wherein the nozzle has a plurality of atomizing chambers, each having a liquid inlet for the pressurized liquid and an outlet for the atomized liquid, a mechanical device for preatomizing the liquid being located in each liquid inlet and oriented so that a path of preatomized liquid entering each atomizing chamber from the liquid inlet is in line with a path of atomized liquid being discharged from the outlet of the chamber.

5. The process of claim 1, in which the mechanical device is selected from the group consisting of a swirl device, a baffle plate, an impingement device, a fan device and an ultrasonic device.

6. The process of claim 1, in which the outlet comprises a circular hole, a rectangular slot, or an elliptical slot.

7. The process of claim 1, in which the outlet has a cross-sectional area in the range from 78.5 to 525.0 mm².

8. The process of claim 1, wherein the atomized liquid is introduced into the fluidized bed through a plurality of nozzles.

9. The process of claim 1, in which the atomized liquid spray is introduced directly into the fluidized bed above an upper limit of a temperature gradient between a gaseous stream fed to the reactor and a remainder of the bed.

10. The process of claim 1, in which the assisting atomizing gas is selected from the group consisting of an inert gas, make-up ethylene and recycled gas.

11. The process of claim 1, in which the separated liquid is introduced as atomized liquid directly into the fluidized bed at a rate in the range of from 0.1 to 4.9 cubic meters of liquid per cubic meter of bed material per hour.

12. The process of claim 1, wherein a throughput of liquid through the nozzle is in the range 10 to 100 m³/h.

13. The process of claim 1, wherein the weight ratio of liquid:total gas introduced into the bed is in the range 1:100 to 1:1.

14. The process of claim 1, wherein the weight ratio of assisting atomizing gas to liquid introduced into the bed is in the range 0.5:1 to 5:1.

15. The process of claim 1, wherein the pressure of the assisting atomizing gas fed to the gas inlet of the atomizing chamber is in the range from 2 to 6 bar above the pressure of the fluidized bed.

16. The process of claim 1, wherein the pressure drop of liquid over the mechanical device is in the range of from 0.5 to 30 bar and the pressure drop of the assisting atomizing gas over the atomizing chamber is in the range of 1 to 6 bar.

17. The process of claim 1, wherein the atomized liquid spray discharged from the outlet of the atomizing chamber has a horizontal momentum flux of at least $50 \times 10^3$ Kg s$^{-1}$ m$^{-2} \times$m s$^{-1}$, wherein the horizontal momentum flux is defined as the mass flow rate of liquid (kilograms per second) in the horizontal direction per unit cross-sectional area (square meters) of the outlet from which the atomized liquid spray emerges, multiplied by the horizontal component of the velocity (meters per second) of the atomized liquid spray.

18. The process of claim 1, wherein the atomized liquid spray is discharged substantially horizontally into the fluidized bed.

* * * * *